US012662650B2

(12) United States Patent
Wu et al.

(10) Patent No.: US 12,662,650 B2
(45) Date of Patent: Jun. 23, 2026

(54) SURFACE TREATMENT METHOD TO REMOVE CONTAMINATED AND IMPLANTED WAVEGUIDE SURFACE

(71) Applicant: Applied Materials, Inc., Santa Clara, CA (US)

(72) Inventors: Wei Wu, Santa Clara, CA (US); Jhenghan Yang, San Jose, CA (US); Yongmei Chen, San Jose, CA (US); Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 244 days.

(21) Appl. No.: 18/472,688

(22) Filed: Sep. 22, 2023

(65) Prior Publication Data

US 2024/0101937 A1 Mar. 28, 2024

Related U.S. Application Data

(60) Provisional application No. 63/376,721, filed on Sep. 22, 2022.

(51) Int. Cl.
*C11D 7/32* (2006.01)

(52) U.S. Cl.
CPC ......... *C11D 7/3281* (2013.01); *C11D 2111/14* (2024.01); *C11D 2111/44* (2024.01); *C11D 2111/46* (2024.01)

(58) Field of Classification Search
None
See application file for complete search history.

(56) References Cited

U.S. PATENT DOCUMENTS

| | | | | |
|---|---|---|---|---|
| 11,487,058 | B2 | 11/2022 | Colak et al. | |
| 2009/0075181 | A1* | 3/2009 | Ha | G03F 1/26 430/5 |
| 2015/0118604 | A1* | 4/2015 | Dynes | H01L 21/302 430/5 |
| 2019/0267248 | A1* | 8/2019 | Chen | H01J 37/32449 |
| 2020/0004134 | A1* | 1/2020 | Wang | H01L 21/0276 |
| 2020/0103745 | A1* | 4/2020 | Yang | G03F 1/24 |

OTHER PUBLICATIONS

"https://ecmdb.ca/compounds/ECMDB01056" (2015), accessed on Jul. 2025. (Year: 2015).*

* cited by examiner

*Primary Examiner* — Kaj K Olsen
*Assistant Examiner* — Arlyn I Rivera-Cordero
(74) *Attorney, Agent, or Firm* — Patterson + Sheridan, LLP

(57) ABSTRACT

Embodiments of the present disclosure herein include a method of removing a contamination material from an optical device. The method may include disposing an optical device in a process chamber, the optical device having optical device structures formed in a substrate, the contamination material is disposed at least on sidewalls of the optical device structures and within trenches between the optical device structures, and exposing the optical device to a plasma generated in the process chamber, the plasma generated from oxygen gas ($O_2$), chlorine gas ($Cl_2$), Argon (Ar), or a combination thereof, the exposing the optical device to the plasma removes the contamination material.

18 Claims, 8 Drawing Sheets

SURFACE TREATMENT METHOD TO REMOVE CONTAMINATED AND IMPLANTED WAVEGUIDE SURFACE

CROSS-REFERENCE TO RELATED APPLICATIONS

This Application claims the benefit of U.S. Provisional Application 63/376,721 filed on Sep. 22, 2022.

BACKGROUND

Field

Embodiments of the present disclosure generally relate to optical devices. More specifically, embodiments described herein relate to methods of removing a contamination material from an optical device.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices including waveguide combiners, such as augmented reality waveguide combiners, and flat optical devices, such as metasurfaces, are used to assist in overlaying images. Generated light is propagated through an optical device until the light exits the optical device and is overlaid on the ambient environment. It is desirable for optical devices to be uncontaminated. Accordingly, what is needed in the art methods of removing a contamination material from an optical device.

SUMMARY

The present disclosure generally includes a method of removing a contamination material from an optical device, that includes disposing an optical device in a process chamber, the optical device having optical device structures formed in a substrate, the contamination material is disposed at least on sidewalls of the optical device structures and within trenches between the optical device structures, and exposing the optical device to a plasma generated in the process chamber, the plasma generated from oxygen gas ($O_2$), chlorine gas ($Cl_2$), Argon (Ar), or a combination thereof, the exposing the optical device to the plasma removes the contamination material.

Embodiments of the present disclosure may further provide a method of removing a contamination material from an optical device including disposing an optical device in an angled etch chamber, the optical device having optical device structures formed in a substrate, the contamination material is disposed at least on sidewalls of the optical device structures and within trenches between the optical device structures, and removing the contaminated material using angled etching by exposing the substrate to a directional plasma generated from oxygen gas ($O_2$) and Argon (Ar).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to methods of removing a contamination material from optical devices. In one embodiment, a method of removing a contamination material from an optical device using etching is provided. In another embodiment, a method of removing a contamination material from an optical device using angled etching is provided.

Figure 1A:
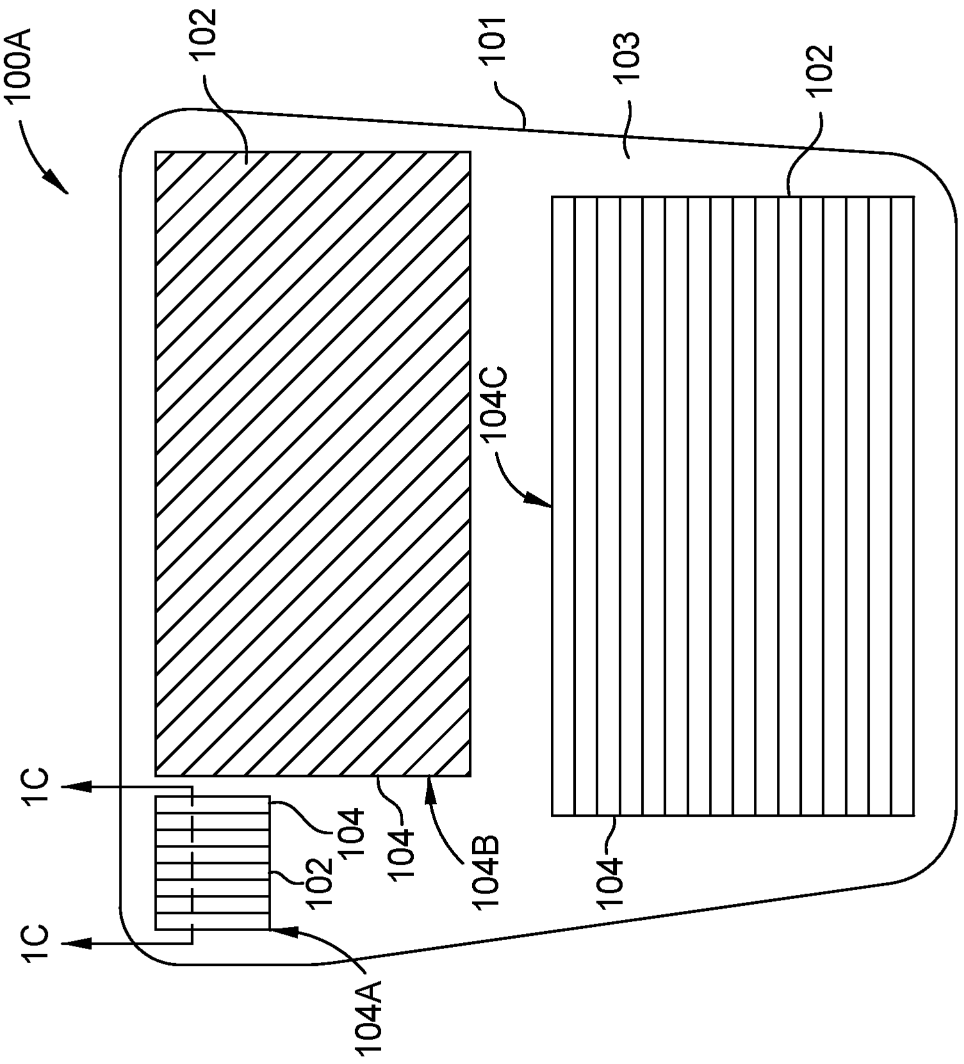
FIG. 1A is a perspective frontal view of an optical device according to embodiments described herein.
Figure 1B:
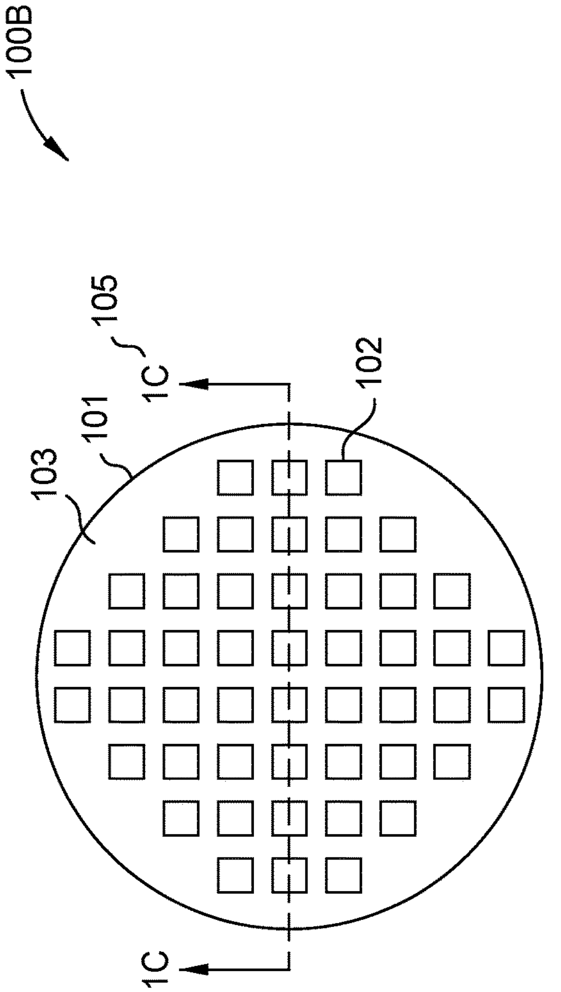
FIG. 1B is schematic top view of an optical device according to embodiments described herein.

FIG. 1A is a perspective, frontal view of an optical device 100A. FIG. 1B is a schematic, top view of an optical device 100B. It is to be understood that the optical devices 100A and 100B described below are exemplary optical devices. In one embodiment, which can be combined with other embodiments described herein, the optical device 100A is a waveguide combiner, such as an augmented reality waveguide combiner. In another embodiment, which can be combined with other embodiments described herein, the optical device 100B is a flat optical device, such as a metasurface. The optical devices 100A and 100B include a plurality of optical device structures 102 disposed on a surface 103 of a substrate 101. The optical device structures 102 may be nanostructures having sub-micron dimensions, e.g., nano-sized dimensions. In one embodiment, which can be combined with other embodiments described herein, regions of the optical device structures 102 correspond to one or more gratings 104, such as a first grating 104*a*, a second grating 104*b*, and a third grating 104*c*. In another embodiment, which can combined with other embodiments described herein, the optical device 100A is a waveguide combiner that includes at least the first grating 104*a* corresponding to an input coupling grating and the third grating 104*c* corresponding to an output coupling grating. The waveguide combiner, according to the embodiment, which can be combined with other embodiments described herein, includes the second grating 104*b* corresponding to an intermediate grating.

While FIG. 1B depicts the optical device structures 102 as having square or rectangular shaped cross-sections, the cross-sections of the optical device structures 102 may have other shapes including, but not limited to, circular, triangular, elliptical, regular polygonal, irregular polygonal, and/or irregular shaped cross-sections. In some embodiments, which can be combined with other embodiments described herein, the cross-sections of the plurality of optical device structures 102 have different shaped cross-sections. In other embodiments, which can be combined with other embodiments described herein, the cross-sections of the optical device structures 102 have cross-sections with substantially the same shape.

Figure 1C:
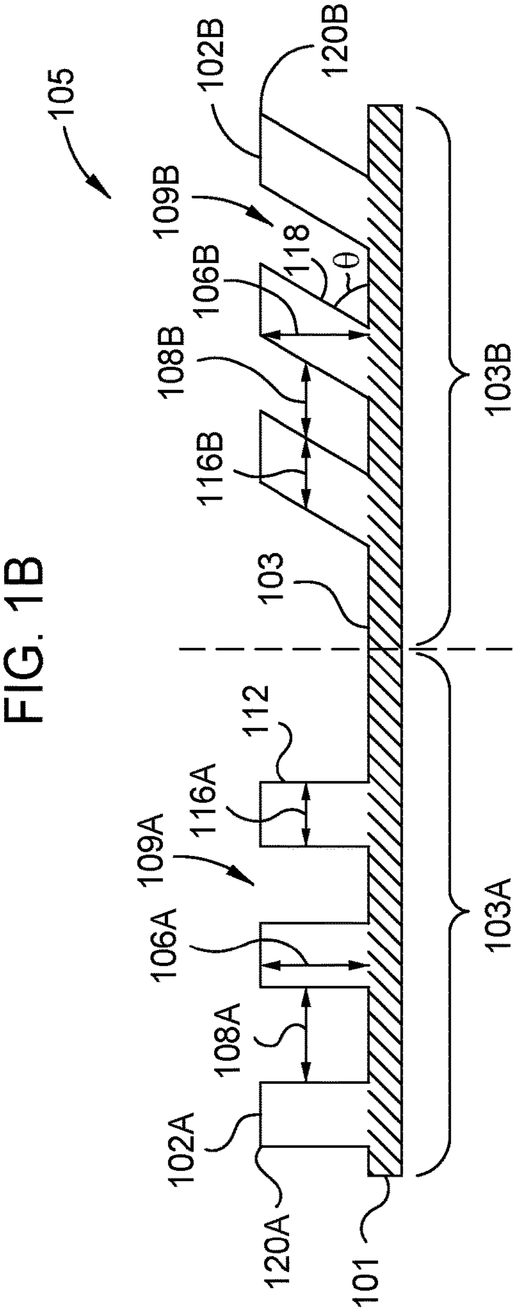
FIG. 1C is a schematic cross-sectional view of a plurality of optical device structures according to embodiments described herein.

FIG. 1C is a schematic cross-sectional view of a plurality of optical device structures 102. FIG. 10 is a portion 105 of the optical device 100A or the optical device 100B. In some embodiments, the portion 105 of the optical devices 100A and 100B include the plurality of optical device structures 102 disposed on a surface 103 of a substrate 101. The portion 105 may correspond to one or more gratings 104. The substrate 101 includes at least one of a first portion 103A or a second portion 103B. The first portion 103A includes first optical device structures 102A. The second portion 103B includes second optical device structures 102B.

In some embodiments, the first optical device structures 102A may be binary structures with a first top surface 120A parallel to the surface 103 of the substrate 101. The sidewalls 118 of each of the first optical device structures 102A are parallel to each other. The sidewalls 118 of each of the first optical device structures 102A are oriented normal to a major axis of the substrate 101. Each optical device structure of the first optical device structures 102A has a first optical device structure width 116A. In one embodiment, which may be combined with other embodiments described herein, the first optical device structure width 116A is less than 1 micrometer (μm) and corresponds to the width or the diameter of each first optical device structure 102A, depending on the cross-section of the first optical device structure 102A. In one embodiment, which can be combined with other embodiments described herein, at least one first optical device structure width 116A may be different from another first optical device structure width 116A. In another embodiment, which can be combined with other embodiments described herein, each first optical device structure width 116A of the first optical device structures 102A is substantially equal to each other.

Each first optical device structure 102A of the plurality of optical device structures 102 has a first height 106A. The first height 106A is the distance from the surface 103 of the substrate 101 to a top surface 120A of each first optical device structure 102A. In one embodiment, which can be combined with other embodiments described herein, at least one first height 106A of the first optical device structures 102A is different than the first height 106A of the other first optical device structures 102A. In another embodiment, which can be combined with other embodiments described herein, each first height 106A of the plurality of first optical device structures 102A is substantially equal to the adjacent first optical device structures 102A.

The first optical device structures 102A include a first critical dimension 108A, i.e., a linewidth, defined as the distance between adjacent first optical device structures 102A. As shown in FIG. 1C, the first critical dimension 108A of each of the adjacent first optical device structures 102A is substantially equal to each other. In some embodiments, which can be combined with other embodiments described herein, at least one a first critical dimension 108A of adjacent first optical device structures 102A is different from the first critical dimension 108A of other adjacent first optical device structures 102A of the portion 105. A first optical device trench 109A is defined by each pair of adjacent first optical device structures 102A of the first optical device structures 102A and the surface 103 of the substrate 101. The width of each first optical device trench 109A corresponds to the first critical dimension 108A. The height of each first optical device trench 109A corresponds to the first height 106A of the adjacent first optical device structures 102A.

The second optical device structures 102B may be angled structures with the sidewalls 118 slanted relative to the surface 103 of the substrate 101. In some embodiments, the second optical device structures 102B with an angle ϑ between one another. Each optical device structure of the plurality of the second optical device structures 102B has a second optical device structure width 116B. In one embodiment, which may be combined with other embodiments described herein, the second optical device structure width 116B is less than 1 micrometer (μm) and corresponds to the width or the diameter of each second optical device structure 102B, depending on the cross-section of the second optical device structure 102B. In one embodiment, which can be combined with other embodiments described herein, at least one second optical device structure width 116B may be different from another second optical device structure width 116B. In another embodiment, which can be combined with other embodiments described herein, each second optical device structure width 116B of the second optical device structures 102B is substantially equal to each other. The second optical device structure widths 116B may be the same or different from the first optical device structure widths 116A.

The second optical device structures 102B of the plurality of optical device structures 102 has a second height 106B. The second height 106B is the distance from the surface 103 of the substrate to a second top surface 120B of each second optical device structure 102B. In one embodiment, which can be combined with other embodiments described herein, at least one second height 106B of the second optical device structures 102B is different that the second height 106B of the other second optical device structures 102B. In another embodiment, which can be combined with other embodiments described herein, each second height 106B of the plurality of second optical device structures 102B is substantially equal to the adjacent second optical device structures 102B. The second heights 106B may be the same or different from the first heights 106A.

The second optical device structures 102B include a second critical dimension 108B, i.e., a linewidth, defined as the distance between adjacent second optical device structures 102B. As shown in FIG. 1C, the second critical dimension 108B of each of the adjacent second optical device structures 102B is substantially equal to each other. In some embodiments, which can be combined with other embodiments described herein, at least one a second critical dimension 108B of adjacent second optical device structures 102B is different from the second critical dimension 108B of other adjacent second optical device structures 102B of the portion 105. The second critical dimension 108B may be the same or different from the first critical dimension 108A. A second optical device trench 109B is defined by each pair of adjacent second optical device structures 102B of the second optical device structures 102B and the surface 103 of the substrate 101. The width of each second optical device trench 109B corresponds to the second critical dimension 108B. The height of each second optical device trench 109B corresponds to the second height 106B of the adjacent second optical device structures 102B.

The second optical device structures 102B are formed at a device angle $\vartheta$ relative to the substrate 101. The device angle $\vartheta$ is the angle between the surface 103 of the substrate 101 and a sidewall 118 of the second optical device structure 102B. In one embodiment, which can be combined with other embodiments described herein, each respective device angle $\vartheta$ for each second optical device structure 102B is substantially equal throughout the portion 105. In another embodiment, which can be combined with other embodiments described herein, at least one respective device angle $\vartheta$ of the plurality of second optical device structures 102B is different than another device angle $\vartheta$ of the plurality of second optical device structures 102B.

The substrate 101 may also be selected to transmit a suitable amount of light of a desired wavelength or wavelength range, such as one or more wavelengths from about 100 to about 3000 nanometers. Without limitation, in some embodiments, the substrate 101 is configured such that the substrate 101 transmits greater than or equal to about 50% to about 100%, of an infrared to ultraviolet region of the light spectrum. The substrate 101 may be formed from any suitable material, provided that the substrate 101 can adequately transmit light in a desired wavelength or wavelength range and can serve as an adequate support for the optical devices 100A and 100B described herein. Substrate selection may include substrates of any suitable material, including, but not limited to, amorphous dielectrics, non-amorphous dielectrics, crystalline dielectrics, silicon oxide, polymers, or combinations thereof. In some embodiments, which may be combined with other embodiments described herein, the substrate 101 includes a transparent material. In one embodiment, which may be combined with other embodiments described herein, the substrate 101 is transparent with absorption coefficient smaller than 0.001. Suitable examples may include, but are not limited to, an oxide, sulfide, phosphide, telluride or combinations thereof. In one example, the substrate 101 includes silicon carbide (SiC), silicon (Si), silicon dioxide ($SiO_2$), germanium (Ge), silicon germanium (SiGe), InP, GaAs, GaN, fused silica, quartz, sapphire, and high-index transparent materials such as glass, or combinations thereof.

Figure 2:
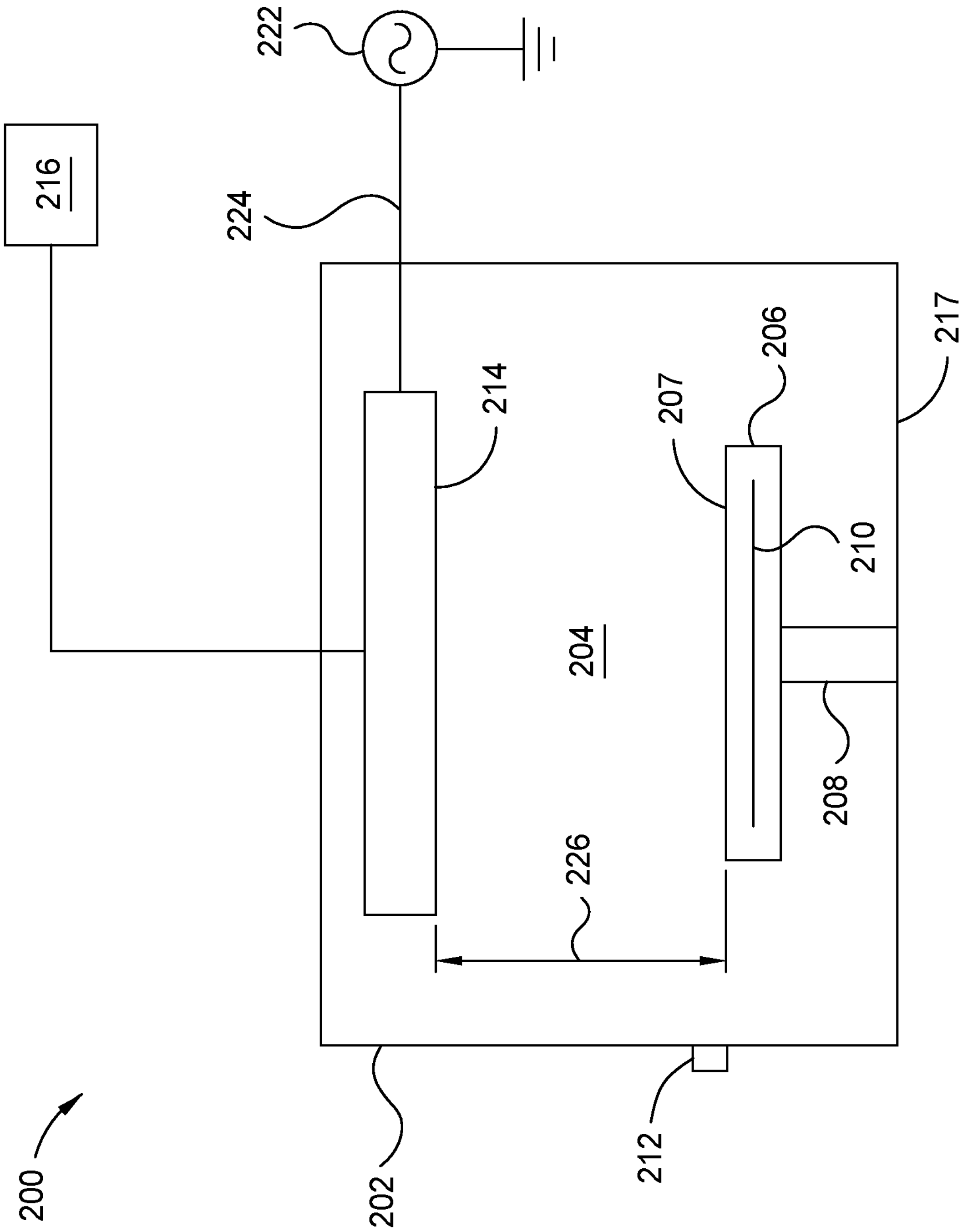
FIG. 2 is a schematic cross-sectional view of a etch chamber according to embodiments described herein.

FIG. 2 is a schematic cross-sectional view of a etch chamber 200. It is to be understood that the system described below is an exemplary system and other systems, including systems from other manufacturers, may be used with or modified to accomplish aspects of the present disclosure.

As shown in FIG. 2, the etch chamber 200 includes the process chamber 217. The process chamber 217 has a chamber body 202 that includes a processing volume 204 that includes a substrate support 206 disposed therein to support a substrate (not shown). The substrate support 206 includes a heating element 210 and a mechanism (not shown) that retains the substrate on a top surface 207 of the substrate support 206, such as an electrostatic chuck, a vacuum chuck, a substrate retaining clamp, or the like. The substrate support 206 is coupled to and movably disposed in the processing volume 204 by a stem 208 connected to a lift system (not shown) that moves the substrate support 206 between an elevated processing position and a lowered position.

A processes gas source 216 may be coupled to the showerhead 214. The process gas source 216 is configured to supply at least one process gas to the showerhead 214. The process gases include, but is not limited to, one or more of a chlorine containing gas ($Cl_2$), an oxygen containing gas ($O_2$), Argon (Ar), or combinations thereof. The showerhead 214 is connected to a RF power source 222 by a RF feed 224 for generating a plasma in the processing volume 204 from the process gasses. In operation, the RF power source 222 provides RF energy to the showerhead 214 to facilitate generation of a plasma between the showerhead 214 and the substrate support 206. The stem 208 is configured to move the substrate support 206 to an elevated processing position at a process distance 226 between top surface 207 and the showerhead 214. The vacuum pump 220 is coupled to the chamber body 202 for controlling the pressure within the processing volume 204.

Figure 3:
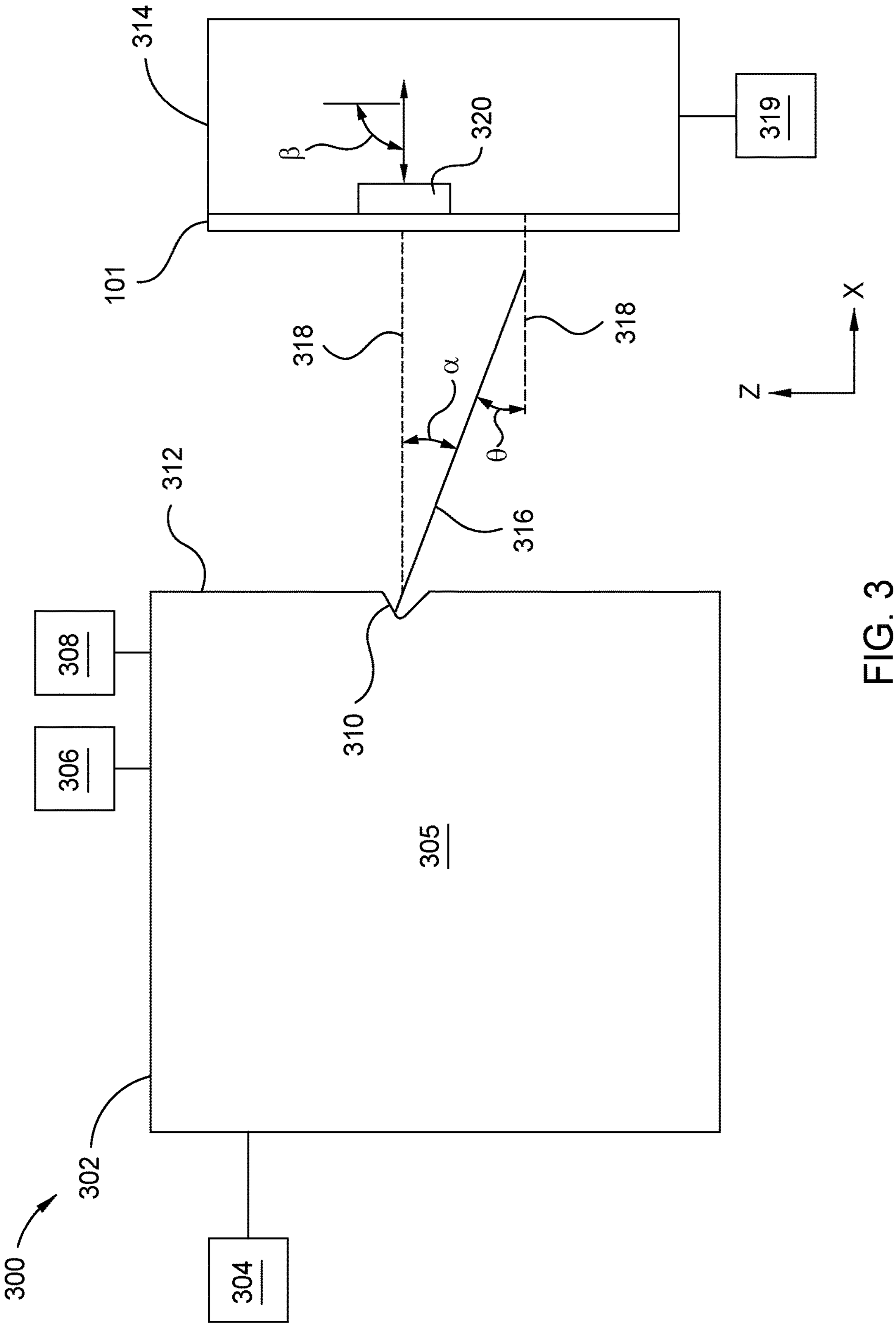
FIG. 3 is a schematic cross-sectional view of an angled etch system according to embodiments described herein.

FIG. 3 is a schematic, side view of an angled etch system 300. It is to be understood that the angled etch system 300 described below is an exemplary angled etch system and other angled etch systems may be used.

The angled etch system 300 includes an ion beam chamber 302. A power source 304, a first gas source 306, and a second gas source are coupled to the ion beam chamber 302. In one embodiment, which can be combined with other embodiments described herein, the power source 304 is a radio frequency (RF) power source. The first gas source 306 is in fluid communication with the interior volume 305 of ion beam chamber 302. The first gas source 306 is an inert gas source which supplies an inert gas to the ion beam chamber 302, such as Ar. The second gas source 308 is in fluid communication with the interior volume 305 of ion beam chamber 302. The second gas source 308 is a process gas source which supplies a process gas to the ion beam chamber 302. The process gases include, but is not limited to, an oxygen containing gas ($O_2$).

In operation, a plasma is generated in the ion beam chamber 302 by applying RF power via the power source 304 to the inert gas and the process gas provided to the interior volume 305 of ion beam chamber 202 to generate a plasma. Ions of the plasma of the inert gas and the process gas are extracted through an aperture 310 of an extraction plate 312 to generate an ion beam 316. The aperture 310 of the ion beam chamber 302 is operable to direct the ion beam 316 at an angle $\alpha$ relative to a datum plane 318 oriented normal to the substrate 101.

The substrate 101 is retained on a platen 314 coupled to a first actuator 319. The first actuator 319, which may be a linear actuator, a rotary actuator, a stepper motor, or the like, is configured to move the platen 314 in a scanning motion along a y-direction and/or a z-direction. In one embodiment, which can be combined with other embodiments described herein, the first actuator 319 is further configured to tilt the platen 314 such that the substrate 101 is positioned at a tilt angle β relative to the x-axis of the ion beam chamber 302. The angle α and tilt angle β result in a beam angle ϑ relative to the datum plane 318 normal to the substrate 101. A second actuator 320 may also be coupled to the platen 314 to rotate the substrate 101 about the x-axis of the platen 314.

Figure 4:
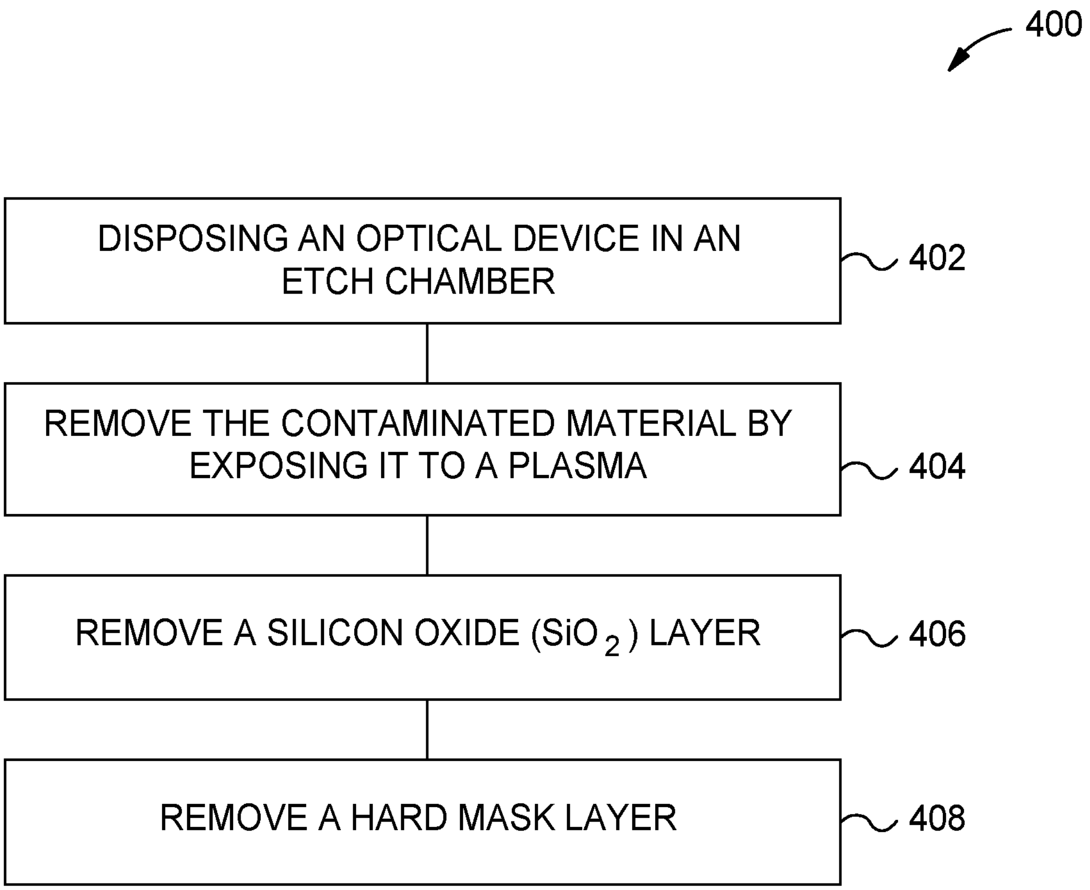
FIG. 4 is a flow diagram of a method of removing a contamination material from an optical device according to embodiments described herein.

FIG. 4 is a flow diagram of a method 400 for removing a contamination material from an optical device, as shown in FIGS. 6A-6E. In one example, method 400 may be performed using etch chamber 200 of FIG. 2.

FIGS. 6A-6E are schematic, cross-sectional views of a substrate during operations of removing a contamination material 602 from the optical device 100A or 100B. FIGS. 6A-6E are a portion 105 of the optical device 100A or the optical device 100B. The portion 105 of the optical devices 100A and 100B include the first optical device structures 102A disposed on a first portion 103A of the surface 103 of a substrate 101, and/or the second optical device structures 102B disposed on a second portion 103B of the surface 103 of the substrate 101. In one embodiment, which can be combined with other embodiments described herein, the portion 105 may correspond to a portion or a whole surface of the substrate 101 of a flat optical device such as optical device 100B illustrated in FIG. 1B. In another embodiment, which can be combined with other embodiments described herein, the portion 105 may correspond to a portion or a whole surface of the substrate 101 of a waveguide combiner, such as optical device 100A illustrated in FIG. 1A. In one embodiment, which can be combined with other embodiments described herein, the portion corresponds to one or more of the first grating 104*a*, the second grating 104*b*, or the third grating 104*c*. In another embodiment, the portion 105 comprises the first optical device structures 102A in both the first portion 103A and the second portion and 103B. In another embodiment, the portion 105 comprises the second optical device structures 102B in both the first portion 103A and the second portion and 103B.

Figure 6A:
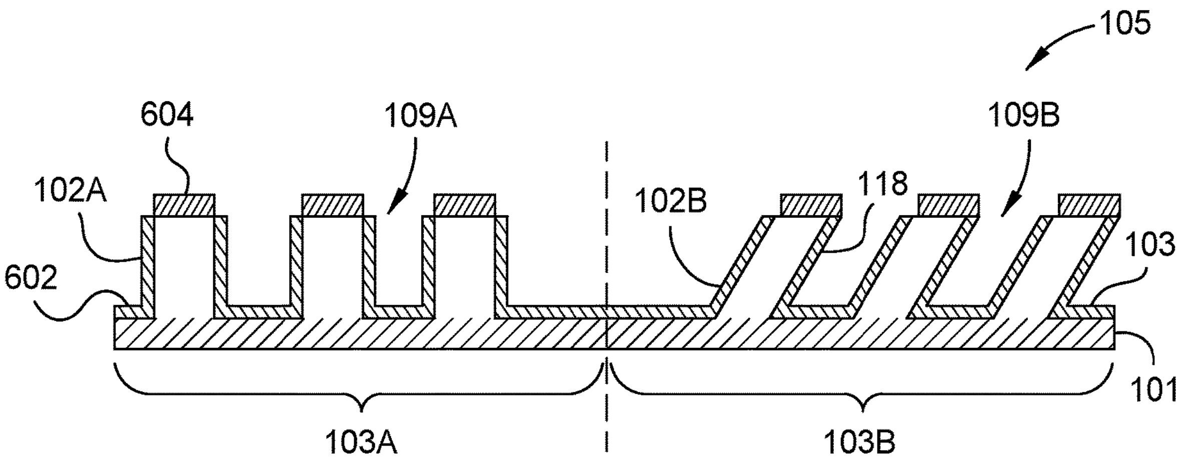
FIGS. 6A-6E are schematic cross sectional view of a portion of a substrate during methods of removing a contamination material from an optical device.

At operation 402, as shown in FIG. 6A, an optical device is disposed in an etch chamber, such as etch chamber 200. Contamination material 602 is disposed on portions of a surface 103 of the substrate 101 disposed between optical device structures 102. The contamination material 602 is formed at least on sidewalls 118 of the first optical device structures 102A and the second optical device structures 102B, and within the first trenches 109A and the second trenches 109B. The contamination material 602 may be deposited during etching of the substrate 101. The contamination material 602 is formed while etching the substrate 101 to form the optical device structures 102. The contamination material 602 may be formed of etch by-products and/or hard mask layer 604 material.

For example, during ion beam etching of the substrate 101, the ion beam may contact the hard mask layer 604 material and redeposit hard mask layer 604 material into the first trenches 109A and the second trenches 109B. The hard mask layer 604 material may include, but is not limited to chromium (Cr), ruthenium (Ru), titanium nitride (TiN), Tantalum nitride (TaN), chromium oxide (CrO), or combinations thereof. Additionally, or alternatively, by-products of the process gasses used during ion-beam etching of the substrate 101 may be implanted in the first trenches 109A and the second trenches 109B.

The contamination material 602 may include, but is not limited to aluminum (Al), Cr, nitrogen (N), oxygen (O), SiC (silicon carbide), Ru, Fluorine (F), carbon (C), or combinations thereof.

Figure 6B:
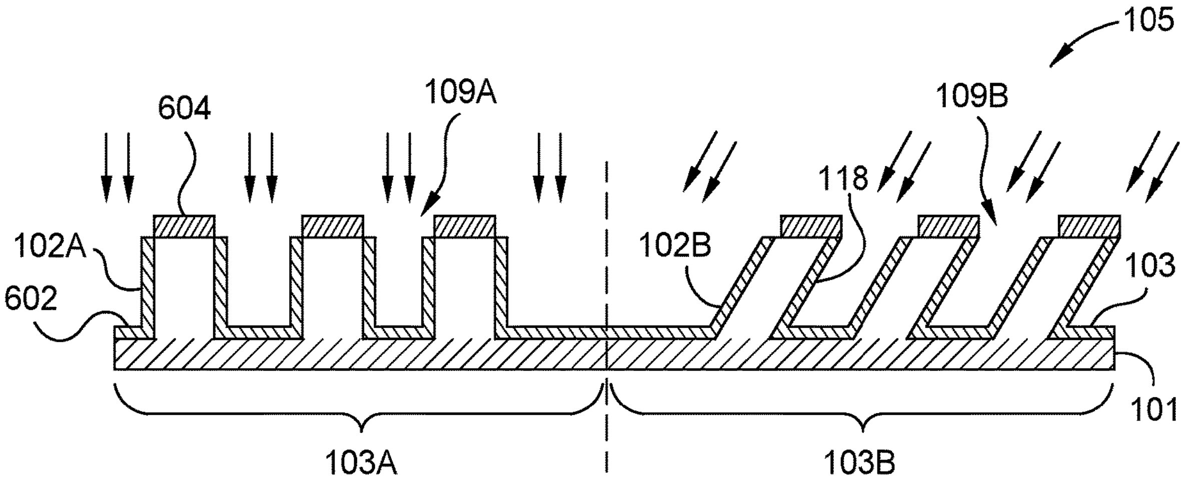
Figure 6C:
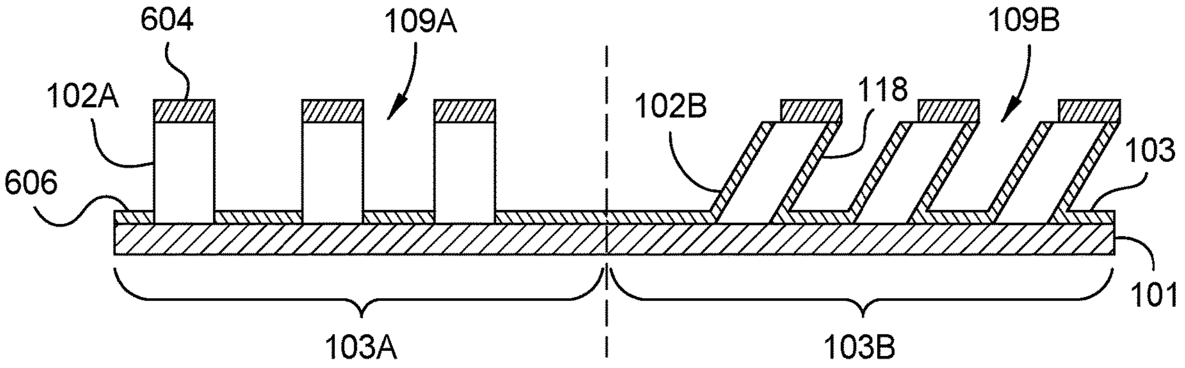

At operation 404, as shown in FIG. 6B, the contamination material 602 is removed. In some embodiments, as described in method 400, the contamination material 602 may be removed using exposing the substrate 101 to a plasma. In one example, the process gasses used to form the plasma include, but are not limited to, $O_2$, $Cl_2$, or argon (Ar). The substrate 101 is exposed to the plasma, and the plasma selectively etches the contamination material 602. As illustrated in FIG. 6C, a silicon oxide ($SiO_2$)-containing layer 606 remains in the trenches after removing the contamination material 602.

Figure 6D:
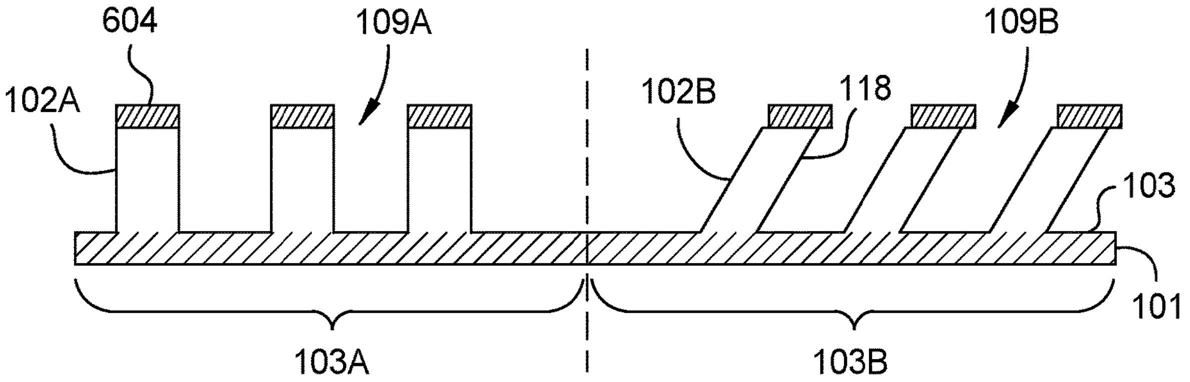

At operation 406, as shown in FIG. 6D, the $SiO_2$-containing layer 606 is removed. The $SiO_2$-containing layer 606 is removed using a wet cleaning process. For example, the wet cleaning process is a wet dihydrofolic acid (dHF) cleaning process.

Figure 6E:
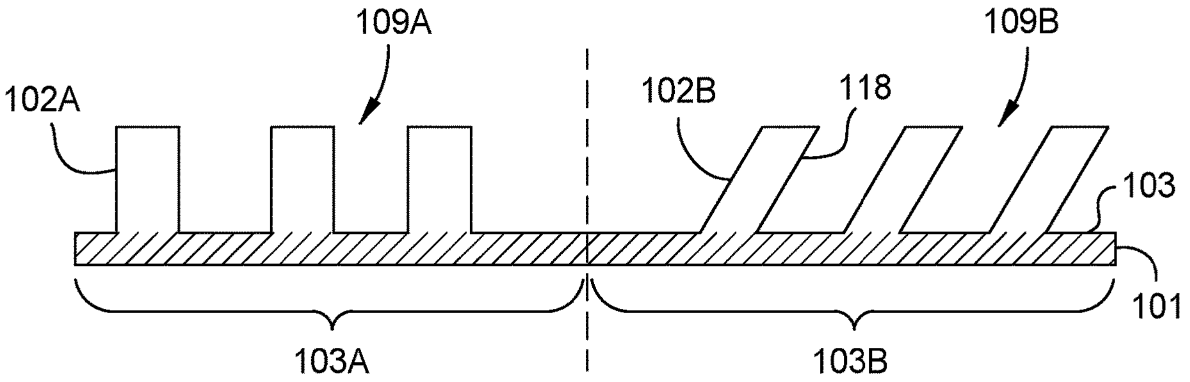

At operation 408, as shown in FIG. 6E, the hard mask layer 604 material may be removed. The hard mask layer 604 material may be removed using either wet or dry cleaning processes.

Figure 5:
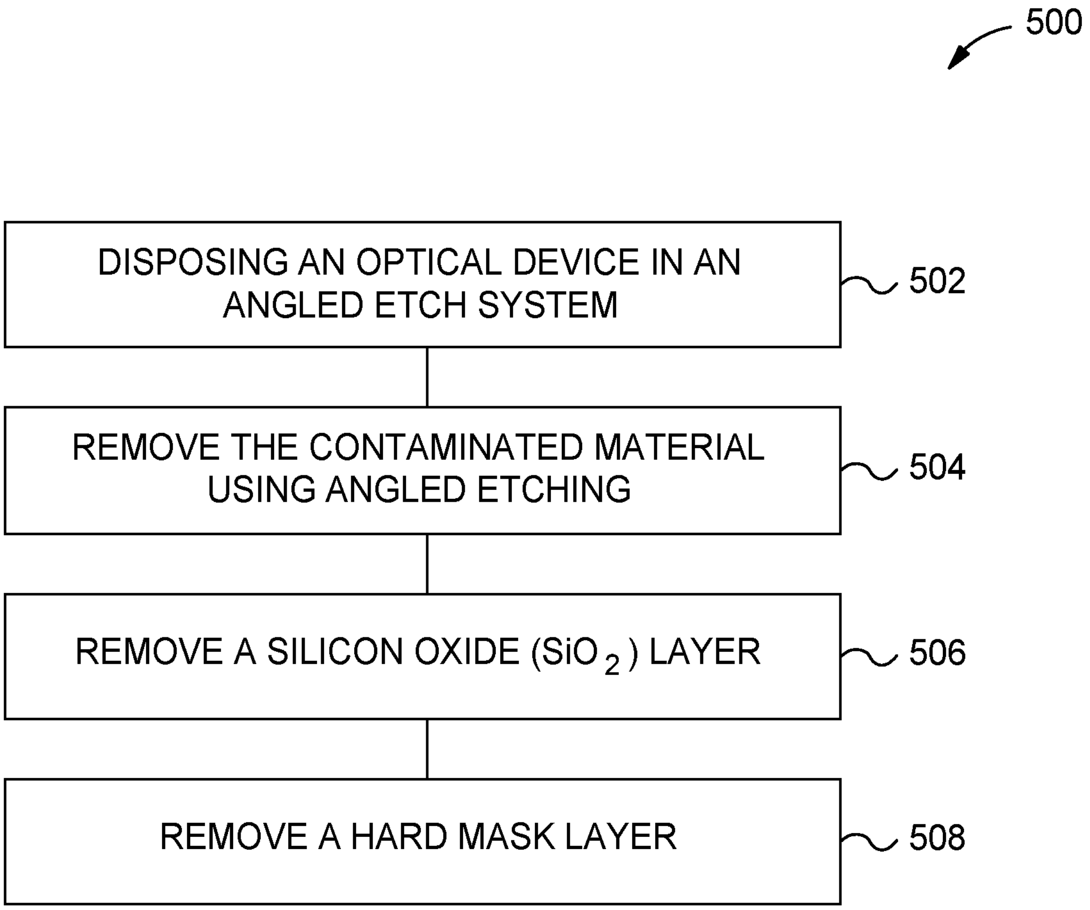
FIG. 5 is a flow diagram of a method of removing a contamination material from an optical device according to embodiments described herein.

FIG. 5 is a flow diagram of a method 500 of removing a contamination material 602 from an optical device, as shown in FIGS. 6A-6E, using ion beam etching. In one example the process of FIG. 5 may be performed by the angled etch system 300.

At operation 502, as shown in FIG. 6A, an optical device is disposed in an angled etch system 300. Contamination material 602 is disposed on portions of a surface 103 of the substrate 101 disposed between optical device structures 102. The contamination material 602 is formed at least on sidewalls 118 of the first optical device structures 102A and the second optical device structures 102B, and within the first trenches 109A and the second trenches 109B. The contamination material 602 may be deposited during etching of the substrate 101. The contamination material 602 is formed while etching the substrate 101 to form the optical device structures 102. The contamination material 602 may be formed of etch by-products and/or hard mask layer 604 material.

For example, during ion beam etching of the substrate 101, the ion beam may contact the hard mask layer 604 material and redeposit the hard mask layer 604 material into the first trenches 109A and the second trenches 109B. The hard mask layer 604 material may include, but is not limited to Cr, Ru, or combinations thereof. Additionally, or alternatively, by-products of the process gasses used during ion beam etching of the substrate 101 are implanted in the first trenches 109A and the second trenches 109B.

The contamination material 602 may include, but is not limited to Al, Cr, N, O, SiC(amorphous), Ru, F, Cl, SiOC, or combinations thereof.

At operation 504, as shown in FIG. 6B, the contamination material 602 is removed by using an angled etch, such as an ion beam etch or a reactive ion etch (RIE). In one example, the process gasses are used to form a directional plasma. The processes gasses used in the angled etch system 300 include, but are not limited to, $O_2$, Ar, or combinations thereof. As illustrated in FIG. 6B, the plasma is directed in a substantially vertical direction over the first optical device structures 102A. Additionally, or alternatively, the plasma is directed over the second optical device structures 102B at an angle. As illustrated in FIG. 6C, a $SiO_2$-containing layer 606 remains in the trenches after etching the contamination material 602. The plasma may bond to the atoms that make-up the contamination material 602, convert the atoms into volatile compounds, resulting in the removal of the contamination material 602.

At operation 506, as shown in FIG. 6D, the $SiO_2$-containing layer 606 is removed. The $SiO_2$-containing layer 606 is removed using a wet cleaning process such a wet dHF cleaning process.

At operation 508, as shown in FIG. 6E, the hard mask layer 604 material is removed. The hard mask layer 604 material may be removed using a dry or a wet chemistry.

In summation, improved methods and materials to form optical devices without contamination. To achieve desirable optical properties, a contamination material 602 is removed using plasma after forming optical device structures 102. The contamination material 602 may absorb a percentage of light in a single interaction. In a waveguide, light may bounce ten to hundreds of times inside a substrate causing significant light loss. Therefore, removing the contamination material 602 significantly increases waveguide efficiency.

While the foregoing is directed to embodiments of the present disclosure, other and further embodiments of the disclosure may be devised without departing from the basic scope thereof, and the scope thereof is determined by the claims that follow.

What is claimed is:

1. A method of removing a contamination material from a waveguide, comprising:

disposing the waveguide in a process chamber, the waveguide comprising an input coupler comprising first optical device structures and an output coupler comprising second optical device structures, and the contamination material is disposed at least on sidewalls of the first optical device structures and the second optical device structures, and within trenches disposed between adjacent first optical device structures and adjacent second optical device structures; and exposing the waveguide to a plasma generated in the process chamber, the plasma generated from oxygen gas ($O_2$), chlorine gas ($Cl_2$), Argon (Ar), or a combination thereof, the exposing the waveguide to the plasma removing the contamination material.

2. The method of claim 1, wherein the first optical device structures and the second optical device structures are binary optical device structures or angled optical device structures.

3. The method of claim 1, wherein the contaminated material comprises a hard mask material or a residual material from an etching process.

4. The method of claim 1, wherein the contamination material comprises silicon carbide (SiC), chromium (Cr), aluminum (Al), ruthenium (Ru), nitrogen (N), oxygen (O), or a combination thereof.

5. The method of claim 1, wherein the waveguide further comprises a substrate made from silicon carbide (SiC).

6. The method of claim 1, wherein the exposing the waveguide to the plasma forms a silicon oxide ($SiO_2$)-containing layer on the sidewalls of the first optical device structures and the second optical device structures and a surface of a substrate disposed between the adjacent first and the adjacent second optical device structures.

7. The method of claim 6, wherein the $SiO_2$-containing layer is removed via a wet cleaning process.

8. The method of claim 1, wherein a hardmask is disposed on a top surface of the first optical device structures and the second optical device structures.

9. The method of claim 8, wherein the hardmask is removed after a wet cleaning process.

10. A method of removing a contamination material from a waveguide, comprising:

disposing the waveguide in an angled etch chamber, the waveguide having an input coupler comprising first optical device structures and an output coupler comprising second optical device structures, and the contamination material is disposed at least on sidewalls of the first optical device structures and the second optical device structures, and within trenches disposed between adjacent first optical device structures and adjacent second optical device structures; and removing the contaminated material using angled etching by exposing the waveguide to a directional plasma generated from oxygen gas ($O_2$) and Argon (Ar).

11. The method of claim 10, wherein the first optical device structures and the second optical device structures are binary optical device structures or angled optical device structures.

12. The method of claim 10, wherein the contamination material comprises a hard mask material or a residual material from an etching process.

13. The method of claim 10, wherein the contamination material is made of silicon carbide (SiC), chromium (Cr), aluminum (Al), ruthenium (Ru), nitrogen (N), oxygen (O), or a combination thereof.

14. The method of claim 10, wherein the waveguide further comprises a substrate made of silicon carbide (SiC).

15. The method of claim 10, wherein the exposing the waveguide to the directional plasma forms a silicon oxide ($SiO_2$)-containing layer on the sidewalls of the first optical device structures and the second optical device structures and a surface of a substrate disposed between the adjacent first optical device structures and the adjacent second optical device structures.

16. The method of claim 15, wherein the $SiO_2$-containing layer is removed via a wet cleaning process.

17. The method of claim 10, wherein a hardmask is disposed on a top surface of the first optical device structures and the second optical device structures.

18. The method of claim 17, wherein the hardmask is removed after a wet cleaning process.

* * * * *